United States Patent [19]

Shimizu

[11] Patent Number: 5,420,842
[45] Date of Patent: May 30, 1995

[54] DISK PLAYER FOR CHANGING THE PLAYING LINEAR VELOCITY IN MULTIPLE STAGES

[75] Inventor: Hidetoshi Shimizu, Ueda, Japan

[73] Assignee: Shinano Kenshi Kabushiki Kaisha, Nagano, Japan

[21] Appl. No.: 139,089

[22] Filed: Oct. 21, 1993

[30] Foreign Application Priority Data

Aug. 20, 1993 [JP] Japan .................. 5-206056

[51] Int. Cl.$^6$ ............................................. G11B 7/00
[52] U.S. Cl. ........................................ 369/50; 369/54
[58] Field of Search .............. 369/32, 42, 48, 50, 369/54, 111, 124

[56] References Cited

U.S. PATENT DOCUMENTS

| | | | |
|---|---|---|---|
| 5,036,508 | 7/1991 | Okano | 369/50 |
| 5,163,035 | 11/1992 | Horikiri | 369/50 X |
| 5,170,386 | 12/1992 | Tateishi | 369/50 |
| 5,278,814 | 1/1994 | Deguchi et al. | 369/50 X |

*Primary Examiner*—W. R. Young

[57] ABSTRACT

The object of the present invention is to provide a disk player, which is capable of changing the playing linear velocity by multiple stages to shorten the reading time. The disk player comprises includes an optical pick-up for reading data and outputting data signals; a first clock section for generating master clock signals, the first clock section being capable of changing the frequency of the master clock signals by multiple stages; a second clock section for generating second clock signals; a comparing section for comparing frequency and phase of the master clock signals and the second signals and generating deviation signals; and a drive section for sending drive signals, whose voltage level changes according to voltage changes of the deviation signals, to a motor for rotating a disk, whereby the drive section controls the motor so as to synchronize the frequency and the phase of the second clock signals with those of the master clock signals.

4 Claims, 1 Drawing Sheet

DISK PLAYER FOR CHANGING THE PLAYING LINEAR VELOCITY IN MULTIPLE STAGES

BACKGROUND OF THE INVENTION

1. Field of the Invention

The present invention relates to a disk player, more precisely relates to a disk player, which is capable of playing data recorded on a disk by the CLV (Constant Linear Velocity) recording form.

2. Description of Background Art

Generally, in conventional disk players, e.g., CD-ROMs, CD-Is, the rotational speed of a disk is continuously controlled so as to maintain playing linear velocity, which is the tracing length of an optical pick-up of the disk player per a predetermined unit time. Thus, a motor for driving the disk is controlled on the basis of the servo control method.

The conventional disk player comprises:
a motor for rotating a disk;
an optical pick-up for reading data recorded on the disk, the optical pick-up being capable of moving in the radial direction with respect to the disk driven by the motor and outputting the data read as data signals;
a first clock section for generating master clock signals, the first clock section being capable of changing the frequency of the master clock signals by two stages;
a second clock section for extracting synchronizing signals from the data signals and generating second clock signals whose frequency is equal to the frequency of the synchronizing signals;
a comparing section for comparing mutual frequency and phase of the master clock signals and the second signals and generating deviation signals whose voltage level corresponds to the differences of the frequency and the phrase thereof; and
a drive section for sending drive signals, whose voltage level changes according to voltage changes of the deviation signals, to the motor, whereby the drive section controls the motor so as to synchronize the frequency and the phase of tile second clock signals with those of the master clock signals.

In the above described conventional disk player, if the frequency of the second clock signals is higher than that of the master clock signals, the voltage level of the deviation signals from the comparing section rises, so that the voltage level of the drive signals from the drive section to the motor falls. Therefore, the rotational speed of the motor is braked, and the frequency of the second clock signals is lowered to that of the master clock signals. On the other hand, if the frequency of the second clock signals is lower than that of the master clock signals, the voltage level of the deviation signals from the comparing section falls, so that the voltage level of the drive signals from the drive section to the motor rises. Therefore, the rotational speed of the motor is accelerated and the frequency of the second clock signals is increased to that of the master clock signals. Since the rotational speed of the disk is controlled on the basis of the above described feed back control method, the playing linear velocity can be maintained at a predetermined velocity.

Moreover, in the conventional disk player, sub codes, data bits, etc. in the data signals are sampled on the basis of the master clock signals or the second clock signals. When they are sampled, firstly the first clock signals are controlled so as to make the playing linear velocity at standard velocity. Afterwards, if the sampling is precisely executed, the playing linear velocity is changed to a higher velocity so as to accelerate the reading speed of the optical pick-up. If sampling errors often occur after the the first clock signals have been switched to higher, the first clock signals are changed to the standard again. The data recorded are read by reciprocally executing the above described control.

However, the conventional disk player has the following disadvantages.

Generally, when the playing linear velocity is higher, sampling errors are likely to occur, so that the number of re-try is increased. Therefore, in case of a lower playing linear velocity with no sampling error, the reading time can be shorter than the case of the higher playing linear velocity with many sampling errors. But the conventional disk players has only two playing linear velocities, that is, the standard velocity and the higher velocity. No intermediate velocity between the standard velocity and the higher velocity can be selected.

In addition, case of playing soiled or damaged disks, the number of the re-try is fairly increased, so that the playing linear velocity is substantially fixed to the standard velocity and the reading time is not improved.

SUMMARY OF THE INVENTION

An object of the present invention is to provide a disk player, which is capable of changing the playing linear velocity by multiple stages and which is capable of shortening the reading time.

To achieve the object, the disk player of the present invention comprises:
an optical pick-up for reading data recorded on the disk, the optical pick-up being capable of moving in the radial direction with respect to the disk driven by the motor and outputting the data read as data signals;
a first clock section for generating master clock signals, the first clock section being capable of changing the frequency of the master clock signals by multiple stages;
said first clock section including a voltage controlled oscillator for generating the master clock signals, an oscillating circuit for generating standard clock signals having predetermined frequency, a first divider circuit for dividing the standard clock signals and generating first divided signals, a second divider circuit for dividing the master clock signals and generating second divided signals, and a phase comparing circuit for comparing the phase of the first divided signals and the second divided signals and generating phase-deviation signals corresponding to the phase deviation thereof and a processing section for generating setting signals, which respectively define the dividing ratio of said first divider circuit and said second divider circuit;
a second clock section for extracting synchronizing signals from the data signals and generating second clock signals whose frequency is equal to the frequency of the synchronizing signals;
a comparing section for comparing mutual frequency and phase of the master clock signals and the second signals and generating deviation signals whose voltage level corresponds to the differences of the frequency and the phrase thereof; and a drive section for sending drive signals, whose voltage level changes according to voltage changes of the deviation signals, to the motor, whereby the drive section controls the motor so as to synchronize the frequency and the phase of the second clock signals with those of the master clock signals.

In the disk player of the present invention, since the first clock section is capable of changing frequency of the master clock signals by multiple stages, the rotational speed of the disk and the playing linear velocity can be changed by multiple stages. Thus, the playing linear velocity can be higher within a range of no sampling error, so that the reading time can be shortened.

BRIEF DESCRIPTION OF THE DRAWING

An embodiment of the present invention will now be described by way of an example and with reference to the accompanying drawing, in which.

DETAILED DESCRIPTION OF THE PREFERRED EMBODIMENT

Figure 1:
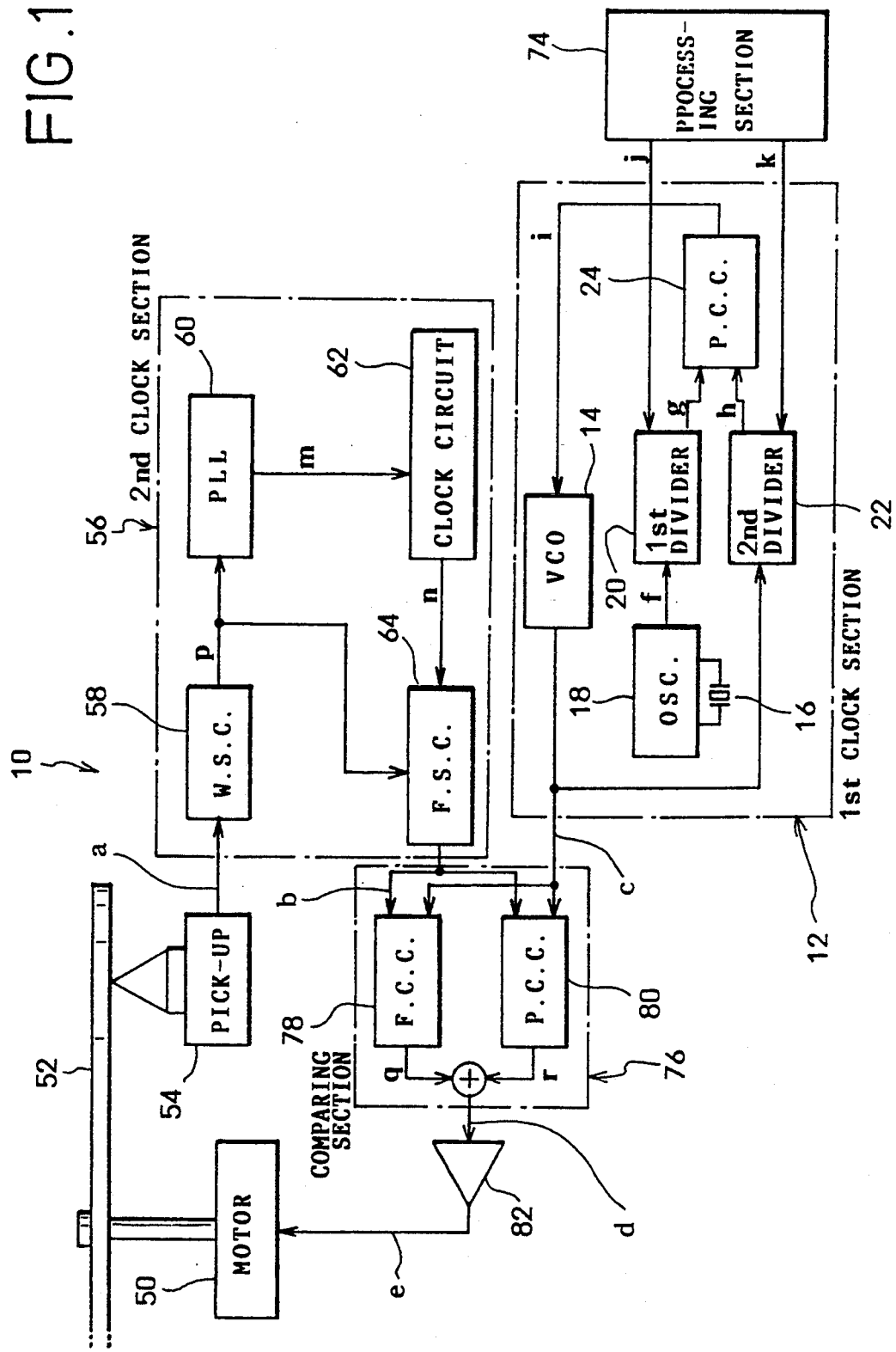
FIG. 1 is a block diagram of a disk player of the embodiment.

The preferred embodiment of the present invention will now be described in detail with reference to the accompanying drawing.

FIG. 1 is a block diagram of the disk player 10 of the present embodiment, which has a CLV servo control unit.

Firstly, the constitution of the disk player 10 will be explained.

A spindle motor 50 rotates a disk 52 on which data are recorded by the CLV form.

An optical pick-up 54 is capable of moving in the radial direction with respect to the disk 52, which is driven by the motor 50. The optical pick-up 54 is driven by a linear motor <not shown). With the movement, the optical pick-up 54 reads the data recorded on the disk 52 and outputs the data as data signals (a).

A first clock section 12 is a phase lock loop (PLL) having a voltage controlled oscillator (VCO) 14, an oscillating circuit 18 including a crystal oscillator 16, a first divider circuit 20, a second divider circuit 22 and a phase comparing circuit 24. Namely, the VCO 14 generates master clock signals (c). The first divider circuit 20 is connected to the oscillating circuit 18, which generates standard clock signals (f) having predetermined frequency, and divides the standard clock signals (f) to output first divided signals (g). The second divider circuit 22 divides the master clock signals (c) to output second divided signals (h). The phase comparing circuit 24 compares a phase of the first divided signals (g) with that of the second divided signals (h), and outputs phase-deviation signals (i), which correspond to phase deviation of both of the signals (g) and (h). The frequency of the master clock signals (c) can be changed in multiple stages by changing the dividing ratio of the first divider circuit 20 and/or the second divider circuit 22. Note that, the dividing ratio of the first divider circuit 20 is 1/M (M stands for natural numbers); the dividing ratio of the second divider circuit 22 is 1/N (N stands for natural numbers).

The second clock section 56 extracts synchronizing signals from the data signals (a) and generates second clock signals (b) whose frequency is equal to the frequency of the synchronizing signals. The second clock section 56 has a waveform shaping circuit 58, a phase lock loop (PLL) circuit 60, a clock circuit 62 and a frame synchronizing circuit 64. The waveform shaping circuit 58 converts the data signals (a), which are analogue signals from the optical pick-up 54, to digital signals (p), and shapes them. The PLL circuit 60 generates train signals (m) whose frequency is equal to bit frequency of the data elements included in the digital signals (p) from the waveform shaping circuit 58. The clock circuit 62 generates third clock signals (n) whose frequency corresponds to cycle time of frames, and is lower than the bit frequency. The frames are one of the data elements recorded on a track of the disk 52 at regular intervals, and they are respectively located between adjacent synchronizing signals. Each frame includes sub codes, data bits, etc. The frame synchronizing circuit 64 generates the second clock (b), whose frequency is equal to the frequency of the synchronizing signals in the digital signals (p), on the basis of the third clock signals (n) and the digital signals (p) from the waveform shaping circuit 58.

A processing section 74 outputs setting signals (j), which define the dividing ratio of the first divider circuit 20, to the first divider circuit 20; the processing section 74 outputs setting signals (k), which define the dividing ratio of the second divider circuit 22, to the second divider circuit 22.

A comparing section 74 has a frequency comparing circuit 78 and a phase comparing circuit 80. The second clock signals (b) from the frame synchronizing circuit 64 and the master clock signals (c) from the VCO 14 are inputted to the frequency comparing circuit 78 and the phase comparing circuit 80. The frequency comparing circuit 78 compares the frequency of the second clock signals (b) with that of the master clock signals (c), and generates frequency-deviation signals (q) whose voltage level corresponds to the difference therebetween. For example, the standard voltage level of the frequency-deviation signals (q) is defined when the frequency of the second clock signals (b) is equal to that of the master clock signals (c). The voltage level of the frequency-deviation signals (q) is higher than the standard voltage level thereof when the frequency of the second clock signals (b) is higher than that of the master clock signals (c). The voltage level of the frequency-deviation signals (q) is lower than the standard voltage level thereof when the frequency of the second clock signals (b) is lower than that of the master clock signals (c). The phase comparing circuit 80 compares the phase of the second clock signals (b) with that of the master clock signals (c), and generates phase-deviation signals (r) whose voltage level corresponds to the deviation therebetween. For example, the standard voltage level of the phase-deviation signals (r) is defined when the phase of the second clock signals (b) is equal to that of the master clock signals (c). The voltage level of the phase-deviation signals (r) is higher than the standard voltage level thereof when the phase of the second clock signals (b) is advanced to that of the master clock signals (c). The voltage level of the phase-deviation signals (r) is lower than the standard voltage level thereof when the phase of the second clock signals (b) is delayed to that of the master clock signals (c). The frequency-deviation signals (q) and the phase-deviation signals (r) are added by a connecting section 81, which is an example of adding means. The adding means adds the signals (q) and (r) so as to generate deviation signals (d), which are output signals of the comparing section 76.

A drive section 82 is an amplifier, which is capable of changing the output voltage level according to the voltage level of the deviation signals (d). The drive section 82 sends its output signals to the spindle motor 50 as drive signals (e). The drive section 82 controls the spindle motor 50 so as to synchronize the frequency and the phase of the second clock signals (b) with those of the master clock signals (c). In the present embodiment, if the voltage level of the deviation signals (d) rises, the voltage level of the drive signals (e) falls down so as to brake the rotation of the spindle motor 50. On the other hand, if the voltage level of the deviation signals (d) falls, the voltage level of the drive signals (e) rises so as to accelerate the rotation of the spindle motor 50.

In the frequency comparing circuit 78 and the phase comparing circuit 80, if the polarity of the second clock signals (b) and the master clock signals (c) are mutually opposite, the drive signals (e) has opposite polarity to the deviation signals (d).

Next, the action of the disk player 10 will be explained.

The second clock section 56 extracts the synchronizing signals from the data signals (a) of the optical pick-up 54. Successively, the second clock section 56 generates the second clock signals (b) whose frequency is equal to that of the synchronizing signals. The comparing section 76 compares frequency and phase of the second clock signals (b) with that of the master clock signals (c), and generates the deviation signals (d) whose voltage level corresponds to the frequency difference and the phase deviation therebetween.

The drive section 82 generates the drive signals (e), whose voltage level changes according to the voltage level of the deviation signals (d), so as to control the rotational speed of the spindle motor 50. For example, if the frequency of the second clock signals (b) is higher than that of the master clock signals (c), the voltage level of the deviation signals (d), which are output of the comparing section 76, rises, and the voltage level of the drive signals (e), which are sent from the drive section 82 to the spindle motor 50, falls down. Therefore, the spindle motor 50 is braked, and the frequency of the second clock signals (b) becomes lower and close to the frequency of the master clock signals (c). On the other hand, if the frequency of the second clock signals (b) is lower than that of the master clock signals (c), the voltage level of the deviation signals (d) falls down, and the voltage level of the drive signals (e) rises. Therefore, the spindle motor 50 is accelerated, and the frequency of the second clock signals (b) becomes higher and close to the frequency of the master clock signals (c).

With the above described feed back control to the rotation of the disk 52, the playing linear velocity can be maintained while the disk player 10 plays.

Next, the multiple-stage control of the frequency of the master clock signals (c) will be concretely explained.

In the present example, the frequency of the standard clock signals (f) is 10 MHz; the dividing ratio of the first divider circuit 20 is 1/10; and the dividing ratio of the second divider circuit 22 is $\frac{1}{4}$. If the frequency of the master clock signals (c) is locked, signals (g) and (h), which are respectively inputted from the divider circuits 20 and 22 to the phase comparing circuit 24, have the same frequency. Thus, the frequency of the signals (g) from the first divider circuit 20 is 1 MHz; and the frequency of the master clock signals (c) is $1\times 4=4$ MHz. In this case, the playing linear velocity is at the standard velocity when the frequency of the master clock signals (c) is 4 MHz.

Next, for example, the processing section 74 sends the setting signals (j) to the first divider circuit 20 so as to set the dividing ratio to 1/9, so that the frequency of the signals (g) from the first divider circuit 20 is $10/9 \simeq 1.11$ MHz. Thus, the frequency of the master clock signals (c) is $1.11\times 4=4.44$ MHz. Namely, the frequency of the master clock signals (c) can be around 1.11 times higher.

If the processing section 74 sends the setting signals (j) to the first divider circuit 20 so as to successively change the dividing ratio to $\frac{1}{8}$, 1/7, 1/6 and 1/5, the frequency of the signals (g) from the first divider circuit 20 successively changes 1.25 MHz, 1.42 MHz, 1.67 MHz and 2.00 MHz, so that the frequency of the master clock signals (c) also can be successively changed, in stages, to 5.00 MHz, 5.71 MHz, 6.67 MHz and 10.0 MHz.

Furthermore, by changing the dividing ratio of the second divider circuit 22 or by simultaneously changing the dividing ratio of both of the divider circuits 20 and 22, the combination of the dividing ratio can be changed, so that the frequency of the master clock signals (c) can be changed in more stages.

In the disk player 10 of the present embodiment, since the first clock section 12 is capable of changing the frequency of the master clock signals (c) in multiple stages by the setting signals (j) and (k) from the processing section 74, the rotational speed of the disk 52 and the playing linear velocity can be changed in multiple stages. Thus, the playing linear velocity can be flexibly changed within a range of no sampling error, so that the reading time can be shortened.

Furthermore, the signal speed of the master clock signals (c) also can be changed when needed by changing the frequency thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disk player, comprising:
   a motor for rotating a disk;
   an optical pick-up for reading data recorded on said disk, said optical pick-up being capable of moving in the radial direction with respect to said disk driven by said motor and outputting the data read as data signals;
   a first clock section for generating master clock signals, said first clock section being capable of changing frequency of the master clock signals by multiple stages;
   said first clock section including a voltage controlled oscillator for generating the master clock signals, an oscillating circuit for generating standard clock signals having predetermined frequency, a first divider circuit for dividing the standard clock signals and generating first divided signals, a second divider circuit for dividing the master clock signals and generating second divided signals, and a phase comparing circuit for comparing the phase of the first divided signals and the second divided signals and generating phase-deviation signals corresponding to the phase deviation thereof and a processing section for generating setting signals, which respectively define the dividing ratio of said first divider circuit and said second divider circuit;

a second clock section for extracting synchronizing signals from the data signals and generating second clock signals whose frequency is equal to the frequency of the synchronizing signals;

a comparing section for comparing mutual frequency and phase of the master clock signals and the second signals and generating deviation signals whose voltage level corresponds to the differences of the frequency and the phase thereof; and a drive section for sending drive signals, whose voltage level changes according to voltage changes of the deviation signals, to said motor, whereby said drive section controls said motor so as to synchronize the frequency and the phase of the second clock signals with those of the master clock signals.

2. The disk player according to claim 1, wherein said second clock section comprises:

a waveform shaping circuit for converting and shaping the analogue data signals, which are generated by said optical pick-up, to digital signals;

a phase lock loop circuit for generating train signals, whose frequency is equal to the frequency of bit frequency of data elements in the digital signals, on the basis of the digital signals from said waveform shaping circuit;

a clock circuit For generating third clock signals whose frequency correspond to frequency of frames in the data elements, which is lower than the bit frequency; and a frame synchronizing circuit for generating the second clock signals, whose frequency is equal to the frequency of the synchronizing signals in the digital signals, on the basis of the third clock signals and the digital signals from the waveform shaping circuit.

3. The disk player according to claim 1, wherein said comparing section comprises:

a frequency comparing circuit for comparing the frequency of the second clock signals and the master clock signals and generating frequency-deviation signals whose voltage level corresponds to the difference therebetween;

a phase comparing circuit for comparing the phase of the second clock signals and the master clock signals and generating phase-deviation signals whose voltage level corresponds to the deviation therebetween; and means for adding the frequency-deviation signals and the phase-deviation signals and generating the deviation signals.

4. The disk player according to claim 1, wherein said drive section is an amplifier, which is capable of changing output voltage level according to the voltage level of the deviation signals.

* * * * *